Nov. 4, 1958         F. P. GLAZIER ET AL         2,859,322
LAMINATED HEATING STRUCTURE

Filed July 19, 1956

INVENTORS
FREDERICK P. GLAZIER
JOSEPH H. NEWMAN
BY
Victor D. Behn
ATTORNEY

United States Patent Office 2,859,322
Patented Nov. 4, 1958

2,859,322
LAMINATED HEATING STRUCTURE

Frederick P. Glazier, River Vale, and Joseph H. Newman, West Orange, N. J., assignors to Curtiss-Wright Corporation, a corporation of Delaware Application July 19, 1956, Serial No. 598,938

4 Claims. (Cl. 201—73)

This invention relates to plastic structurally rigid articles or panel members and is particularly directed to such articles or members having electric heating wire or other electric heating elements embedded therein.

An object of the present invention comprises the provision of a novel and simple but strong plastic structure having electric wire heating means therein. In accordance with the present invention the plastic structure has a laminated construction to provide the body with the desired heat insulation and structural properties.

Other objects of the invention will become apparent upon reading the annexed detailed description in connection with the drawing in which.

Figure 2:
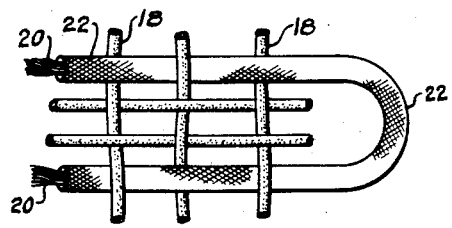
Fig. 2 is an enlarged diagrammatic view of the reinforcing fibers and electric heating elements of Fig. 1.

Referring to the drawing, a laminated plastic heating structure 10 is illustrated as comprising layers 12, 14 and 16. The front layer 12 comprises a rigid fiber-reinforced plastic layer. The plastic should be a thermosetting and dimensionally stable material such as a polyester, phenolic, epoxy or other suitable resin while the reinforcing fibers 18 preferably are glass fibers in fabric or mat form. In addition, electric heating means, illustrated as a finely stranded wire 20 in Fig. 2, is embedded within the layer 12. As illustrated, the electric wires 20 may be covered with a braided fiber glass sheath 22 or with other electric insulating material and interwoven with the reinforcing fibers 18. Such electric insulation, however, is not required if the plastic material of the layer 12 has adequate electric insulating properties. With the electric wires 20 embedded within the layer 12, said wires also function as reinforcing elements for the plastic layer 12. The wires 20 extend to the edges of the reinforced plastic layer 12 for connection to a suitable source of electric power (not shown).

The back layer 16, like the front layer 12, is a rigid fiber-reinforced plastic layer. The layer 16 however does not have electric heating means embedded therein. Except for this difference the front and back layers 12 and 16 are essentially the same.

The layer 14, disposed between the layers 12 and 16, is a foam plastic, as for example a rigid polyisocyanate plastic foam. This foam plastic layer 14 is bonded to the layers 12 and 16, for example by a suitable adhesive or the polyisocyanate may be foamed in place between the layers 12 and 14 so as to adhere directly thereto.

The foam plastic layer 14 acts as a heat insulating layer to prevent or minimize heat flow from the electric heating wires 20 toward the back layer 16.

A laminated plastic heating structure 10, as described, not only may be made in flat panels but may be fabricated into any desired shape or contour for various uses, and the electric heating means 20 may be incorporated in either the front or back layer 12 or 14 or in both said layers depending on the direction or directions of heat flow desired. Thus the laminated structure 10 may be made for use as a building wall panel, for heated table tops or other parts of furniture, for de-icing panels for aircraft as well as for other flat or formed structures.

Where for example, the laminated structure 10 is used as a heated wall panel, the outer surface of at least one of the layers 12 or 16 may also be provided with a special finish or surface layer for sound absorption and/or for decoration. Thus, for decorative purposes a layer 24, for example of glass fabric, may be bonded to the outer surface of the layer 12.

Figure 3:
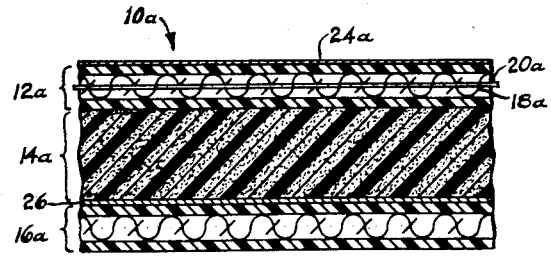
Fig. 3 is a view similar to Fig. 1 but illustrating a modified construction.

For certain uses, for example when used as a building wall panel, it may be desirable to increase the heat insulating properties of the structure 10 by adding a metallic heat reflecting layer such as aluminum foil. Such a modification is illustrated in Fig. 3. For convenience of understanding the parts of Fig. 3 have been designated by the same reference numerals as the corresponding parts of Fig. 1 but with a subscript $a$ added thereto.

Figure 1:
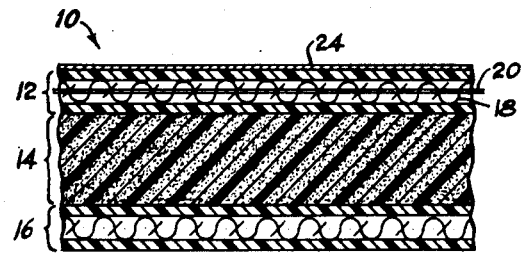
Fig. 1 is an enlarged transverse sectional view through a portion of a plastic body embodying the invention.

The composite structure or panel 10a of Fig. 3 is like the structure 10 of Fig. 1 except an aluminum foil layer 26 has been interposed between and bonded to the foam plastic layer 14a and the reinforced plastic layer 16a. The added layer 26 helps the foam plastic layer 14a in preventing heat flow from the heating means 20a through the back layer 16a of the panel 10a. Likewise where the panel 10a forms part of the outer wall of a building, the aluminum foil layer 26 would help in warm weather to prevent the transmittal of outside heat into the building.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A rigid laminated heating structure comprising a first fiber-reinforced rigid plastic layer; a second fiber-reinforced rigid plastic layer; a third layer of rigid foam plastic disposed between and bonded to said first and second layers over substantially the entire area of the facing surfaces of said layers; and electric heating means carried by said structure on one side of said foam plastic layer.

2. A rigid laminated heating structure comprising a first fiber-reinforced rigid plastic layer; a second fiber-reinforced rigid plastic layer; and a third layer of rigid foam plastic disposed between and bonded to said first and second layers over substantially the entire area of the facing surfaces of said layers; said first layer including electric heating means embedded therein.

3. A rigid laminated heating structure comprising a first rigid plastic layer reinforced with glass fibers; a second rigid plastic layer reinforced with glass fibers; and a third layer of rigid foam plastic disposed between and bonded to said first and second layers, said first layer including glass fiber covered electric heating wires embedded therein and interwoven with the glass fibers in said layer.

4. A rigid laminated heating structure comprising a first fiber-reinforced rigid plastic layer; a second fiber-reinforced rigid plastic layer; a third layer of rigid foam plastic disposed between and secured to said first and second layers; electric heating means carried by said structure on one side of said foam plastic layer; and a metallic foil-like layer interposed between said foam plastic layer and the fiber-reinforced plastic layer disposed on the side of said foam plastic layer opposite to said heating means.

References Cited in the file of this patent
UNITED STATES PATENTS

| | | |
|---|---|---|
| 2,381,218 | Jacob | Aug. 7, 1945 |
| 2,600,485 | Cox | June 17, 1952 |
| 2,639,252 | Simon et al. | May 19, 1953 |
| 2,698,893 | Ballard | Jan. 4, 1955 |